US006233623B1

(12) United States Patent
Jeffords et al.

(10) Patent No.: US 6,233,623 B1
(45) Date of Patent: *May 15, 2001

(54) REPLICATED RESOURCE MANAGEMENT SYSTEM FOR MANAGING RESOURCES IN A DISTRIBUTED APPLICATION AND MAINTAINING A RELATIVISTIC VIEW OF STATE

(75) Inventors: Jason Jeffords, Dover; Roger Dev, Durham, both of NH (US)

(73) Assignee: Cabletron Systems, Inc., Rochester, NH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/585,054

(22) Filed: Jan. 11, 1996

(51) Int. Cl.$^7$ ........................................... G06F 9/44
(52) U.S. Cl. .............................. 709/316; 711/173
(58) Field of Search ................... 395/670–678; 711/1–5, 100–173, 200–221; 709/1, 100–108, 200–253, 300–305, 316

(56) References Cited

U.S. PATENT DOCUMENTS

| 5,179,554 | 1/1993 | Lomicka et al. ............ 370/85.13 |
|---|---|---|
| 5,261,044 | 11/1993 | Dev et al. ........................ 395/159 |
| 5,263,165 | * 11/1993 | Janis ................................. 395/725 |
| 5,485,455 | 1/1996 | Dobbins et al. ................. 370/60 |
| 5,619,682 | * 9/1997 | Mayer et al. .................... 395/500 |
| 5,852,719 | * 9/1997 | Fishler et al. ............. 395/200.46 |

FOREIGN PATENT DOCUMENTS

| 0408812 A1 | 1/1991 | (EP) | .................. G06F/9/44 |
|---|---|---|---|
| 0447339 A2 | 9/1991 | (EP) | ................. G06F/1/100 |
| 0501610 A2 | 9/1992 | (EP) | .................. G06F/9/44 |
| 0 511 851 | 11/1992 | (EP) | ................. G06F/13/00 |
| WO92/05485 | 4/1992 | (WO) | .................. G06F/9/46 |

OTHER PUBLICATIONS

Neuman et al, Resource Management for Distributed Parallel Systems, IEEE 1993.*

Shimizu et al, Hierarchical Object Groups in Distributed Operating Systems, IEEE 1988.*

Sherman et al, Architecture of the Encina Distributed Transaction Processing Family, ACM 1993.*

Kara et al, An Architecture for Integrated Network Management, IEEE 1989.*

* cited by examiner

*Primary Examiner*—Alvin E. Oberley
*Assistant Examiner*—St. John Courtenay, III
(74) *Attorney, Agent, or Firm*—Wolf, Greenfield & Sacks, P.C.

(57) ABSTRACT

A method and apparatus for accessing resource objects contained in a distributed memory space in a communications network, including dividing the distributed memory space into a plurality of memory pools, each pool containing a collection of resource objects, providing a plurality of resource manager objects, each resource manager object having an associated set of memory pools and a registry of network unique identifiers for the resource objects in those pools, and accessing a given resource object via its network identifier. Another aspect of the invention is to provide a relativistic view of state of a plurality of objects, each object generating a state vector representing that object's view of its own state and the state of all other objects, each object sending its state vector to other objects, and each object maintaining a state matrix of the state vectors.

46 Claims, 5 Drawing Sheets

|  | OBJECT A | OBJECT B | OBJECT C | OBJECT D | ... |
|---|---|---|---|---|---|
| OBJECT A: | STATE 1 | STATE n | STATE 3 | STATE 2 | ... |

FIG. 5

|  | OBJECT A | OBJECT B | OBJECT C | OBJECT D | ... |
|---|---|---|---|---|---|
| OBJECT A: | STATE 1 | STATE n | STATE 3 | STATE 2 | ... |
| OBJECT B: | STATE 3 | STATE 2 | STATE 3 | STATE n | ... |
| OBJECT C: | STATE n | STATE 1 | STATE n | STATE 1 | ... |
| OBJECT D: | STATE 3 | STATE 2 | STATE 1 | STATE 2 | ... |
| ⋮ | ⋮ | ⋮ | ⋮ | ⋮ | ... |

REPLICATED RESOURCE MANAGEMENT SYSTEM FOR MANAGING RESOURCES IN A DISTRIBUTED APPLICATION AND MAINTAINING A RELATIVISTIC VIEW OF STATE

FIELD OF THE INVENTION

The present invention relates to a system for controlling and coordinating distributed applications and for maintaining a relativistic view of state which can be used, for example, to insure a consistent view of resources in a distributed computing function.

BACKGROUND OF THE INVENTION

Distributed processing has many different forms and embodies many different techniques depending on the nature of the data and the objectives of a given application. Typical objectives include: transaction performance, locality of data, minimization of network traffic, high availability, minimization of storage requirements, extensibility, cost to produce, etc. Many applications have certain objectives of overriding significance which dictate the distributed processing technique employed.

There is one type of application for which the overriding concern is high availability (resiliency). This type includes switching systems used in a communications network, as well as control systems in the areas of avionics, industrial control, and stock trading. In these systems, it is assumed that any component may fail and the system must continue to run in the event of such failure. These systems are designed to be "fault-tolerant" usually by sacrificing many other objectives (e.g. cost, performance, flexibility and storage) in order to achieve high availability.

Traditionally, fault-tolerant systems have been built as tightly coupled systems with specialized hardware and software components all directed toward achieving high availability. It would thus be desirable to provide a more generally applicable technique for achieving high availability without reliance on specialized components.

Another important factor for a distributed application is the need to know the relative state of a plurality of peer processes before certain actions occur. Such coordination of effort requires that each process know not only what it thinks about the state of the other processes, but also what the other processes think about its state. This is called a "relativistic" view of process state.

For example, assume a system has been developed that uses four cooperating processes to perform a task. Also assume that all four processes must be active before the coordinated task can begin; an active process is defined as a process that has successfully contacted its peers. On system start-up, each process must contact all other processes. After contacting its peers, each process must wait until all other processes have contacted their peers. Thus, only after all processes have contacted their peers, and all the peers know of this contact status, can the task begin.

This is actually a very common situation when attempting to coordinate a task among several processes. It would be desirable to provide a mechanism for gathering a relativistic view of state among various processes.

SUMMARY OF THE INVENTION

In one aspect, the present invention is a method for constructing high-availability distributed applications. This method, referred to herein as "Replicated Resource Management" (RRM), provides a core set of services which enable the replication of data (e.g., state) information in a plurality of processes and optionally the sharing of workload by those processes. This core set of service enables synchronization of each new RRM process with existing RRM processes, recovery in the event of a process level or other failure, and an application level interface (to the RRM) that enables easy and effective use of RRM services in a distributed application.

RRM utilizes a distributed memory space, which an RRM process may examine at will. An RRM process may join and leave a distributed computing function, also at will. The shared memory space persists across process boundaries so long as at least one RRM process remains (or a persistent store is employed).

An analogy may be drawn between RRM and a long-running meeting or plurality of meetings in different rooms. People may come and go from a given meeting, and the meeting may continue indefinitely. As people enter a meeting, they are given information that allows them to participate in the meeting. As they leave, the meeting continues, using information they may have supplied. As long as at least one person remains in the room, the meeting can be said to be continuing (in session). If the last person leaves the room, all information gathered and distributed in the meeting may be recorded, so that an interested party may retrieve this information at a later date.

Figure 1:
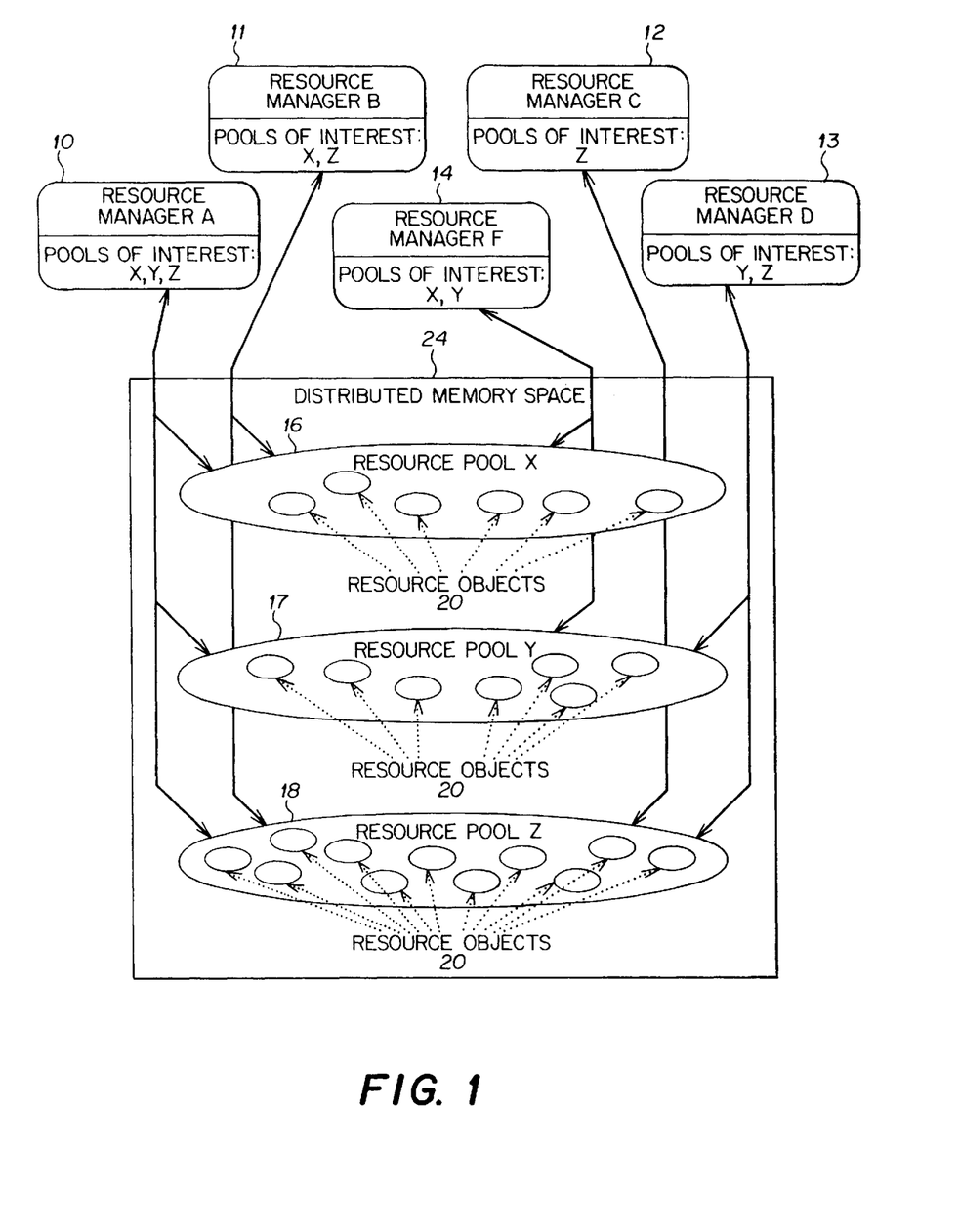
FIG. 1 is a schematic system level overview of the replicated resource management (RRM) system of this invention.

In the above analogy, the meeting room is analogous to a shared memory space or resource pool. The people participating in the meeting are analogous to RRM processes, and the information exchanged is analogous to RRM resources. This is illustrated in FIG. 1, where each RRM process has an associated resource manager (RM) which identifies several resource pools of interest, i.e., several meetings which are of interest to the person. In this way, a resource manager (process) participates in just its areas (pools) of interest, maintains a registry of resources in these associated pools, and includes mechanisms for communicating with other resource managers (processes) in order to maintain a consistent view of the state of the resources in the associated pools.

In another aspect, the invention provides a mechanism which allows a distributed application to develop a "relativistic view" of the state of its processes. More generally, the mechanism may be used to provide a relativistic view of any process or object. In the following discussion, we refer to objects instead of processes. The invention provides three procedures for defining a relativistic view of state, which may be used separately or together.

Figure 4:
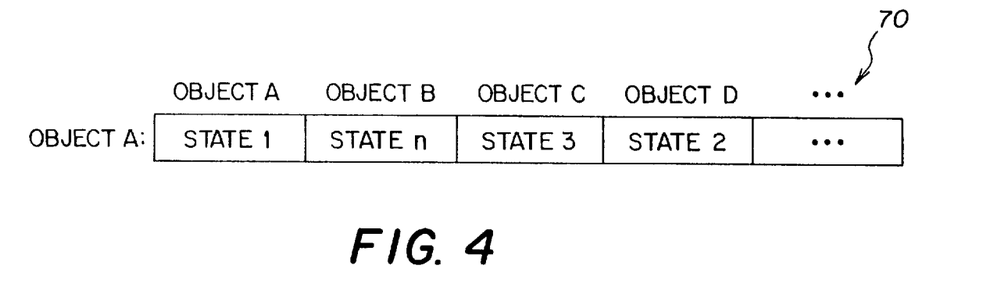
FIG. 4 is an example of a state vector.

First, a state vector is provided. This is a one-dimensional associative array of logical object name to logical object state. The name is an "index" into the vector, and the state is stored in a "slot" associated with the index. A state vector is generated by an object and describes what that object thinks is the state of all objects in the vector. It is the object's view of itself and "relative" view of all other objects. A state vector is illustrated in FIG. 4.

Second, a state matrix (see FIG. 5) is a two-dimensional associative array composed of state vectors. Rows and columns of the matrix are indexed by logical object name; the intersection of a row and column defines a "slot". A row describes what an object thinks is the state of all objects in the row (this is the same as the state vector described above), while a column describes what all objects think is the state of a single object. General rules are provided for determining whether each of the state vectors and/or state matrices is determinant. For example, a determinant contact status may be achieved when every active resource manager agrees on the present state of all other active resource managers.

Figure 6:
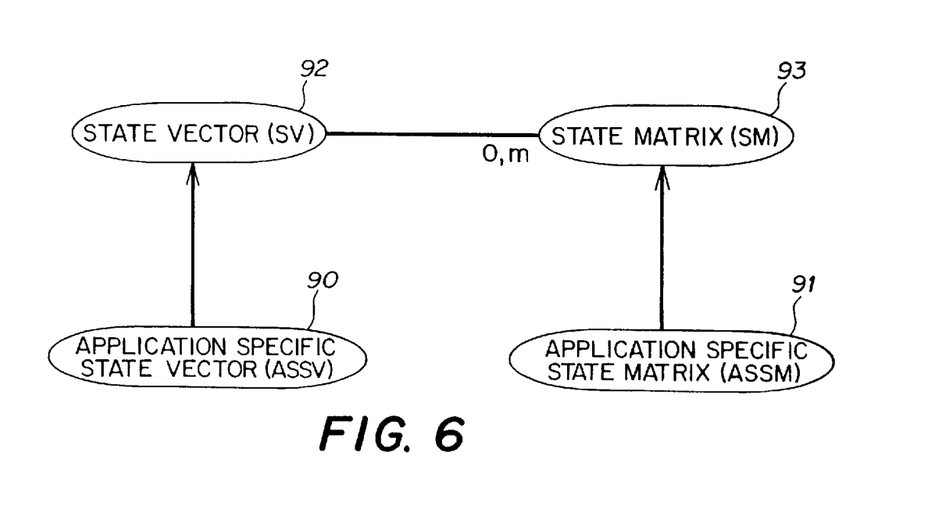
FIG. 6 is a schematic illustration showing derivation of application specific state vectors (ASSV's) and application specific state matrices (ASSM's)

Third, application specific logic (ASL—i.e., a set of rules specific to an application) may be applied to the general rules associated with state vectors and state matrices for providing application specific state vectors (ASSVs) and application specific state matrices (ASSMs), respectively. Because state vectors and state matrices are objects, ASL may be added to them by derivation. As illustrated in FIG. 6, a zero, cardinality relationship (o, m) indicates that a state matrix is composed of zero or many state vectors. This relationship is inherited by the application specific state vectors and application specific state matrices. Again, by way of example, the ASSVs and ASSMs may be used to determine the contact status of processes in a distributed application.

These and other features of the present invention will be more fully understood by the following detailed description and drawings.

DETAILED DESCRIPTION

RRM Overview

A glossary of terms is included at the end of the detailed description. A particular replicated resource management (RRM) system described herein is implemented in the C++ object-oriented programming language.

FIG. 1 is a system level overview of the major RRM components. A plurality of resource managers (10, 11, 12, 13, 14) are provided, each having an associated set of resource pools (16, 17, 18). A distributed memory space (24) exists across the network for the duration of an RRM processing session, and is segmented by the resource pools (16, 17, 18). Each resource manager (RM): participates in the distribution and synchronization of the resource objects (20) in its associated pools; includes a central registry of resources in its associated pools; and contains mechanisms for communicating with other resource managers. As described hereinafter, a resource manager specifies its pools of interest to all other active resource managers, after which time it will receive all of the resource objects in the pools of interest.

A resource pool (16, 17, 18) is a distributed object whose purpose is to collect and organize a coherent set of distributed resources. Resource pools are embodied through a set of one or more resource managers on one or more host systems (see FIG. 3).

A resource object (20) has attributes (data) that are significant to the overall system. Resource objects are contained in resource pools and like the resource pools, are distributed objects. Resource objects exist in all the same resource managers as their containing resource pool. Resources are sub-classed by users of a system in order to provide application level object information, i.e., users derive their objects from a resource class. In this way, the user's information is replicated across all applicable resource managers.

Applications run on top of the RRM system (i.e., they use the RRM's services). Several different applications may view the same resource pools at any given time. This allows information to be shared between applications performing different tasks on, or with, the resource objects maintained by the RRM system.

Figure 2:
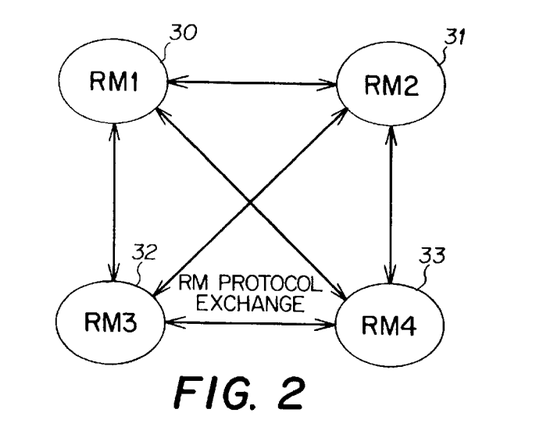
FIG. 2 is a schematic illustration of communication between resource managers RM1–RM4.

FIG. 2 illustrates four resource managers (30–33), exchanging information in order to maintain a coherent set of distributed resources. This exchange of information will be further described below in regard to the maintenance of a relativistic view of state between objects.

Figure 3:
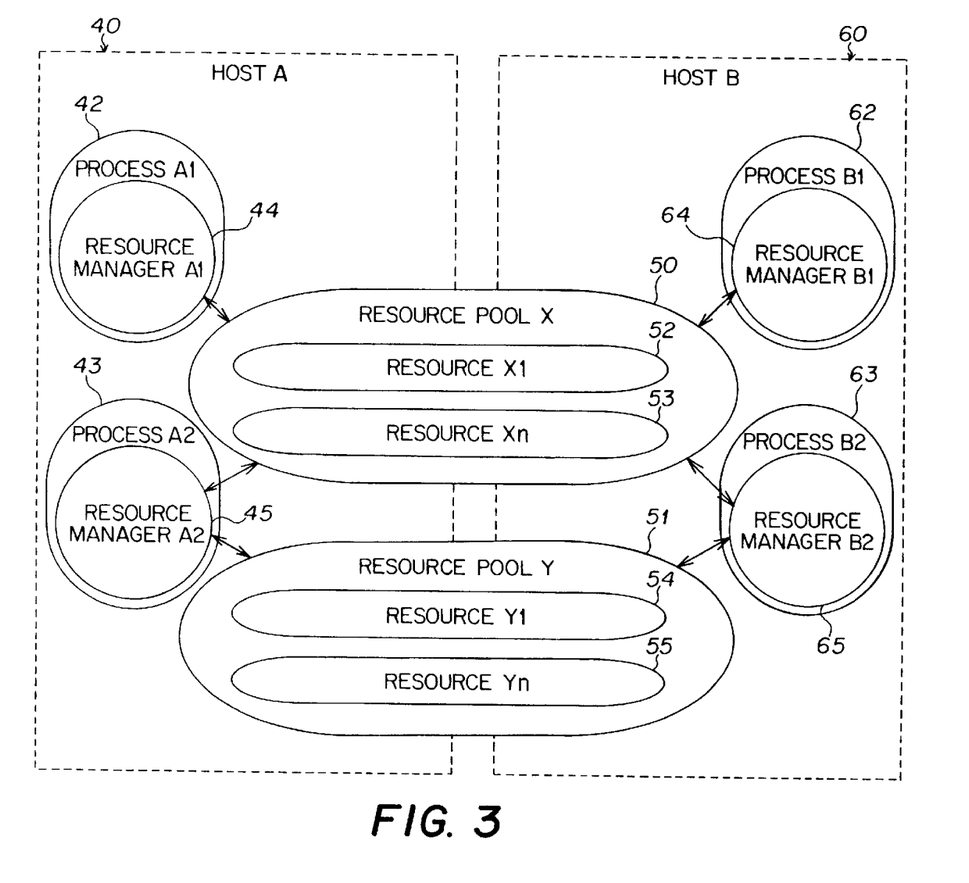
FIG. 3 is a schematic architectural view of hosts A and B, each having their own processes and resource managers, but sharing a distributed memory space containing a number of resource pools.

FIG. 3 illustrates a distribution of RRM components in a communications network. For example, host A (40) has a plurality of processes designated as Process A1 (42) and Process A2 (43). Each process contains a resource manager (44 and 45 respectively). The processes A1 and A2 each have their own pools of interest, designated by arrows directed to shared resource pools (50–51). The pools, designated as resource pools X and Y, each contain one or more resources (52–55), designated as X1 through XN, and Y1 through YN, respectively. As shown in FIG. 3, Process A1 is interested in Resource Pool X; Process A2 is interested in both of Resource Pools X and Y. A second host B (60) contains its own set of processes, designated as Process B1 (62) and Process B2 (63), with their own resource managers (64, 65). Process B1 is interested in Resource Pool X, while Process B2 is interested in both of Resource Pools X and Y.

The following is a more detailed description of RRM operation and services, with subheadings provided for ease of understanding.

RRM Services

RRM provides many services—some of which are transparent to applications, while others are used by applications.

Internal services are transparent to the applications, i.e., the applications see the effects of these services but do not need or want to access them directly. Some of the more important transparent services may include:

process and network status (state) determination message and object transport object-level message delivery automatic object and state replication

RRM synchronization and constancy maintenance basic fail/over capability

External (application level) services are used by applications directly through the RRM's application interface (API). The major services may include:

distributed object-level messaging and remote procedure calls (RPCs)

object-level contact established/lost notification distributed object-level attribute changes and attribute change notification hooks for application level object ownership arbitration and ownership change Each application that wishes to use the RRM will:

include the RRM subsystem;

initialize the RRM subsystem with:
- its peers (i.e., other processes this RRM should communicate with); and
- the resource pools this application is interested in.

The processes that compose an RRM system may be started in a completely asynchronous manner, that is, they may be started in any order and at any time. Therefore, it is important that each resource manager handles or avoids all potentially destructive/dangerous start-up interactions.

When an RRM process starts, it attempts to contact all other RRM processes it has been configured to know about. If no other RRM processes exist in the network, the RRM process starts itself in stand-alone mode. This allows an application to run nearly as quickly as it would run without the RRM capability.

If an RRM process determines that it is running in a network with other RRM processes, it establishes a dialog (connection) with the other processes in the network. During this discovery process, each RRM process learns about the relative state of all other RRM processes in the network. This is done through a resource manager state vector exchange protocol, i.e., the use of state matrices filled by the vectors received at each resource manager (see subsequent discussion). Once a stable (deterministic) network state has been achieved (all active RRM processes are reporting the same state information about each other), synchronization of resource pools is initiated.

Similar to synchronization of peer processes, initialization also involves synchronization of the resource pools in which a given application has an interest. This is described in greater detail below under "Consistency and Synchronization."

Once the RRM subsystem is initialized with the above information, its services may be used by the application. At this point, the application may do the following:

examine/use the resource objects in the resource pools instantiate new resource objects in the resource pools delete resource objects from the resource pools change the attributes of resource objects receive attribute change notifications for resource objects use object-level messaging and object-level remote procedure calls receive contact lost/established notifications RRM application level services are provided almost entirely through the resource object base class. Thus, an application that wants to use the RRM will need to derive its distributable/managed objects (resources) from the RRM's resource object.

When using the RRM, an application developer needs to decide what objects/information should be distributed to peer applications. This decision can involve many complex trade-offs between overall system performance, resiliency, and application level requirements.

RRM performance can be difficult to quantify as it is greatly influenced by application level design and constraints. However, performance within the RRM is affected by two major factors:

distribution and synchronization of state parallelism of processing in RRM processes RRM processes maintain a distributed, shared memory space. As such, each resource object's state information is accessible within each participating RRM process. This "sharing of state" comes with a cost, both in terms of maintaining state synchronization information and in actually passing state information between RRM processes.

This cost can be offset through the parallelism inherent in RRM processes. Since several RRM processes can use the shared state information simultaneously, and can communicate through object level messaging and remote procedure calls, the cost of state maintenance is offset through the distribution of processing load. Carefully designed applications can use the facilities of the RRM to enhance performance, while simultaneously gaining resiliency.

Resiliency, which can be one of the major benefits of RRM, is gained through the sharing of state (resource objects) and the concept of resource object ownership. Each RRM process "owns" certain resource objects. Object ownership denotes what process is responsible for performing all processing for the "owned" object. In short, the owner of an object does all work associated with that object. When a process fails, all objects owned by the failed process must have their ownership changed to processes that are still participating in the distributed computing function. This is done automatically by the RRM (see "Failure and Recovery" below).

Applications that wish to be resilient must decide what state information needs to be distributed so that they may recover in the event of a process failure. Consider the following example: a network switch control system consisting of one active switch controller and one hot-standby controller. In the event of failure of the first switch controller, the hot-standby takes control of the switches managed by the first controller. The goal of this system is to provide virtually uninterrupted network service in the event of switch controller failure.

Varying degrees of resiliency and network service can be supplied by this system. If a very high availability system is desired, the following state information may be distributed:

the network's physical topology (switches, edge devices, and links); and all connections present in the network.

Given this information, the hot-standby controller could non-disruptively take control of the switched network in the event of controller failure. However, several other levels of service may be offered depending on the type and amount of state information being distributed. At least two other schemes could be employed:

propagate no resource objects, but use the RRM's process level failure detection capabilities; or propagate topology information by creating resource objects that represent the network topology.

The first option would provide resiliency through process level failure detection, but would cause major disruptions in network availability. In this case, the switch controller that takes over the network will have no information about the current state of the network. Thus, before it could take control of the network it would have to discover or confirm the current physical topology of the network, and place all switches in a known state (or discover all connections in the network). All of these operations would take time during which network service would be disrupted.

The second option provides resiliency through process level failure detection and maintains the current physical topology of the network. Thus, the discovery/confirmation stage listed above is not required. However, all switches must still be placed in a known state before network service can be restored.

Performance and resiliency are just two application level requirements that RRM can positively affect. The RRM may also be used to:

simplify the development of client-server (or full peer-to-peer) applications;

provide a distributed, shared object environment.

For example, groupware applications such as a distributed white board could be implemented using the RRM. In this case, the distributed, shared object is the white board. In this application, several clients may see and manipulate the white board simultaneously across the network. The RRM provides the infrastructure enabling the sharing of objects in this application.

Interprocess Communications (IPCs)

The RRM processes must communicate with each other to perform the RRM function. RRM interprocess communications (IPC) may take several forms based on the underlying system services, but all RRM-IPCs are message based (i.e., use message passing). Some system services that may be used for RRM-IPCs include:

shared memory pipes sockets Each of these communication mechanisms exhibit slightly different behaviors and uses different semantics. Thus, the RRM must have a message-based isolation layer that sits above the underlying system services. This isolation layer provides a consistent IPC interface to the higher layer RRM functions.

By way of example, TCP sockets (integrated by the TCP Server module) can be used for guaranteed data delivery. UDP sockets can be used for non-critical data delivery and messaging. See D. Comer, "Internetworking with TCP/IP," Vol. 1, 2nd ed (1991), for a discussion of the TCP and UDP protocols. A TCP Server is a communications entity that uses TCP sockets (stream based, connection oriented, guaranteed data delivery) to emulate UDP sockets (packet based, connectionless, nonguaranteed data delivery). The resulting service is a packet based, connectionless, guaranteed data delivery service that provides several higher layer functions as well.

The TCP Server delivers data as packets through a connectionless interface. It also provides notification (through callbacks) of server status (contact established/lost), and data received to registered clients. Both of these functions are required by the RRM, that is, the RRM must know what processes are participating/able to participate, and it must know when data is received.

Thus, a TCP Server can provide three major services to the RRM:

guaranteed data/message delivery (IPCs);

notification when data is received; and notification of server status changes (contact established/lost).

Alternatively, these functions may be provided by another protocol.

Detection of Process Level Failures

The RRM should detect process level failures in a timely and reliable manner. Each IPC mechanism used by the RRM may also be used to detect process level failures. To increase reliability and timeliness of process failure detection, several IPC mechanisms may be used in parallel. For example, both the TCP Server protocol and a UDP Keep Alive protocol (based on hello/heartbeat protocols) can be used for process level failure detections.

Distributed Shared Memory Model

Objects managed by the RRM can be thought of as being stored in a distributed memory space which exists across the network. Each RRM process "sees" this memory space and can access any objects in the distributed memory. As RRM processes come and go, the distributed memory remains (until there are no longer any RRM processes). Thus, the distributed memory is persistent across both process (time) and location (space) boundaries.

Two major aspects of the distributed memory space are:

its organization (memory models); and the identification of objects within the memory space.

For example, with a "flat" memory model a resource manager would see all objects in existence in the memory space. This has the benefit of complete visibility into all the system's objects. However, it has disadvantages in that all RMs must maintain the state of all objects (utilizing excessive memory), and the manageability of objects is reduced (there is no knowledge or identification of object functionality and no way to organize objects according to their applications).

Thus, the present invention uses memory "pools" which allow the distributed memory space to be segmented. This permits resource managers (RMs) to only look at certain "pools of interest", thereby reducing the memory requirements of RMs that are only interested in a subset of the memory space. The use of memory pools also allows certain application specific memory spaces (pools) to be defined. For example, in a virtual network switching system a pool of active call objects may be defined. Any application wishing to view all the active calls in the network may then join this pool only, not the entire distributed memory space. Finally, by creating a global, default pool for all applications, a flat memory model can be supported by using the default pool (this is the degenerate case).

Every object in the distributed memory space must be uniquely identified. When an object is created in a normal application, this can be accomplished through the use of a memory pointer. However, in a distributed shared memory this is no longer possible (because several applications may use the same value for the memory pointer within their local memory space). Thus, objects in the distributed memory space are identified by unique (across time and space) object identifiers (OIDs). In the present embodiment, every object is given a network unique OID when it is created. Once an object is created, its OID never changes. Uniqueness of OIDs must be maintained across process boundaries for the duration of the existence of the distributed memory space. For example, OIDs can take the following form:

PoolOID.ServiceAddress.InstanceID where:

PoolOID is the name of the memory pool which contains the resource object

ServiceAddress uniquely identifies the process within the network that created the object, e.g., for IP sockets, ServiceAddress may take the form Host Name: Port Number InstanceID is a unique ID identifying an instance of an object under the prefix given by PoolOID.ServiceAddress An object in the distributed memory space is accessed by de-referencing its OID. This is equivalent to de-referencing a normal memory pointer. Thus, objects in the distributed memory can be treated as if they are part of local, system memory.

Object-level Messaging (OLM)

Because RRM processes can come and go at will, RRM must support location-independent, object-level messaging. That is, given an object's OID, an application using the RRM services must be able to send a message to that object without knowing:

how many replicas of the object exist; and where (in what processes) the object exists. In contrast, if each application was required to maintain location information for replicated objects (along with pools, etc.), application programming in the RRM environment would become extremely complex.

Thus, when a message is sent to an object, the application program should not need to know anything more than the object's OID. The RRM Service delivers the message to the object appropriately. All object-level messages should preferably be sent and received in a non-blocking, asynchronous manner.

Location-independent, object-level remote procedure calls (ORPCs) allow an object's methods to be called (no matter where the object resides) and the results of each method call to be returned to the calling process. The calling process does not need to know where (by what process) the ORPC will be serviced.

ORPCs are completely asynchronous. Specifically, a thread in a calling process may wait for the response to an ORPC, but the entire calling process does not block waiting for an ORPC. Also, many ORPCs may be outstanding at any point in time (many threads may be blocked waiting for ORPCs). If a process failure is detected, all outstanding ORPCs that have been sent to that process are cleared and then retried (sent to the new owner).

Currently there are competing standards for the classical functional Remote Procedure Call (RPC) mechanism. Two camps exist, Open Network Computing (ONC) (supported by AT&T, Sun, Novel, and Netwise) and the enhanced Network Computing System (NCS) (from HP/Apollo with backers IBM, DEC, Apollo, and Microsoft).

Two major standards for functional RPC's emerged from the above camps, ONC ROC and NCS RPC. The NCS RPC mechanism was selected by the Open Software Foundation (OSF) as the basis for RPCs in its Distributed Computing Environment (DCE). Because of this, the NCS RPC mechanism is commonly known as DCE RPC while the ONC RPC mechanism is commonly known as Sun RPC. See "Power Programming with RPC," by John Bloomer, O'Reilly & Associates, Inc., Copyright 1992.

The RPC mechanism described in this invention extends the classical functional RPC mechanism by making it both object-oriented and fault-tolerant.

Object Ownership

Work flow within the RRM system is controlled through object "ownership". Each RRM process may "own" zero or many resource objects. Each resource object has one, and only one, "owner" at any given time. The process that "owns" an object is responsible for doing all processing, or work, associated with that object.

Work flow within the RRM system may be localized, distributed, or balanced based on object ownership. Algorithms for each of these types of behaviors can be defined externally by application level processing without changing the core RRM functionality. The RRM provides basic object ownership behavior as well as hooks for object ownership change.

When an object is created, its default owner is the process in which it was created. Over time, a resource's owner may change—its OID is never changed, rather it is the "value" of the ownership property which is changed when an object's ownership is assigned to another process.

When an RRM process fails or terminates, all the resource objects it owned must have their ownership changed to one of the remaining RRM processes. This may be accomplished by providing a default ownership arbitration algorithm in the base resource object class. The default algorithm may be overridden by derived, application level classes as desired.

Upon RRM process failure, every resource object in all the pools of interest must be notified of the RRM failure. Each resource object must then decide if it was owned by the failed RRM. If it was, it must call its ownership arbitration method to determine the identity of its new owner. Since the same algorithm is run by every resource object in all processes, and all RRM processes maintain a consistent view of all participating RRMs, the same new owner is determined in all locations (in parallel).

Resource object ownership may be changed explicitly by the owning resource manager process. This may be done to redistribute processing load or to allow a resource manager to leave a pool of interest without leaving its objects unattended.

State Replication Management

The RRM must manage and coordinate the replication of state between RRM processes. All state is replicated at the object level, e.g., the level of granularity for state replication is an object's attributes.

State replication is coordinated at both the memory space (resource pool) and the process (resource manager) levels.

There are two major components of state replication:

replication of the object itself (replication of the construction of the object); and replication of the object's attributes.

Replication of an object's construction occurs when an object is first created within a resource pool, and when a resource pool is synchronized. Replication of an object's attributes occurs incrementally as the attributes' state changes. Both of these replication functions require an object transport function.

The RRM provides a means by which software objects are transported between processes. The object transport function is able to take any "supported" software object and convert it to a transportable (distributable) representation that may be sent to and received from any RRM processes. Supported software objects are objects that can be distributed (streamed).

Thus, the object transport function obtains an object's distributable representation from that object and creates an object from its distributable representation; this is accomplished by an object packetization service, also known as streaming and unstreaming, or packing and unpacking. A second function of the object transport function is to send and receive an object's distributable representation; this is supported by using the RM's IPC layer.

An object's distributable representation must include the object's type, attributes and their values. If an object's attribute is a reference to another object, and referential integrity must be maintained, the reference must be to a distributable object, and the reference must be distributed as a reference object. Reference attributes are resolved at the receiving side of the transport function so that referential integrity between objects is maintained.

As an object's attribute changes, these changes are propagated to all of the RRM processes containing that object. Attribute changes are controlled at the object level through a method, i.e., "writeattr" for each attribute change. Attribute changes are sent to other processes using a "commit" method. Each of these operations are handled at the object level (they are methods of the resource object). Attribute change notification occurs through the "attribute-changed" virtual method.

Synchronization

Several levels of synchronization (consistency checks) occur within the RRM. The highest is done at the process level to ensure that all RRM processes are being coordinated and that they have a consistent view of both the distributed memory and the state of the network (the processes they are communicating with).

Process level consistency checks may include:

determining the state of all RRM processes in the network (initial, contact established, contact loss) from the perspective of each RRM process;

ensuring that every active RRM process has the same view of the state of all other RRM processes; and ensuring that each RRM process has a consistent, synchronized view of the distributed memory in which it is interested.

Process level synchronization is achieved when:

a consistent view of the state of all processes in the network is achieved; and all pools of interest for this RRM process have been synchronized (see memory level synchronization below).

When an RRM process enters a distributed computing function it must send a join pool request to all active RRM processes for each resource pool it is interested in. Each one of the active processes must respond with either a positive acknowledgment (meaning it is also interested in the pool specified), or a negative acknowledgment (it is not interested). Each of the positively responding processes must then send all of the objects it is responsible for ("owns") in the pool to the process joining the pool (when a pure in memory replication scheme is used). If the process joining the pool already has objects in that pool that it is responsible for, it must send those objects to each of the processes that responded positively. In this way, each pool is synchronized in both directions for every process that is interested in the pool.

A separate level of synchronization and consistency checks occurs at the memory level. This ensures that: (1) a consistent view of memory pool existence and RRM process attachment is maintained (i.e., what processes have joined what pools); (2) each pool's objects are distributed and maintained consistently; and (3) the relative state of pool synchronization is distributed and checked.

Memory level consistency checks include:

agreement as to which RRM processes are interested in each pool; and relativistic synchronization of each pool.

Memory level synchronization includes:

distribution of all objects created within a pool to all RRM processes interested in (joined to) the pool (synchronization of object existence); and bidirectional pool synchronization and agreement upon the pool's synchronization state between all RRM processes joined to each pool.

Memory level synchronization is achieved when:

every resource pool an RRM process is interested in is synchronized with respect to the given RRM process; a resource pool is synchronized with respect to a given RRM process when all other RRM processes have sent their owned objects to the given RRM process and the given RRM process has sent its owned objects to all other interested RRM processes.

The final level of synchronization occurs at the object level. This synchronization takes two forms, object creation synchronization and object state synchronization. Object existence is synchronized by the resource pools when an object is created in a resource pool. Upon object creation, all interested RRM processes are notified of the object's creation when the object arrives at each interested RRM process.

An object's state is synchronized as its attributes are modified (written to). In this case, all instances of an object are updated as the object's state changes. See the previous discussion of attribute change management, i.e., the "write_attr( )" and "commit( )" methods.

Failure and Recovery

All RRM process failures are detected by the remaining RRM processes as they occur. Recovery involves rearbitration of object ownership by the remaining RRM processes. Failed processes may rejoin the distributed computing function after failure.

Determination of which process is responsible for each object is done through object ownership arbitration. Each process must block all other threads that may be executed as it determines the new owner for each affected object. Once all affected objects have a new owner, normal processing continues. Thus, ownership change and transfer of control is automatic within a process.

Arbitration of object ownership allows the remaining RRM processes to continue the distributed processing function in the event of catastrophic process level failures. Once an RRM process fails, it may try to reenter the distributed computing function by rejoining its pools of interest. This is handled exactly the same way as if the RRM process had entered the network for the first time (see process level synchronization previously described).

Relativistic State

In the particular embodiment described herein, the present invention provides a mechanism that allows a distributed application to develop a relativistic view of the state of its processes. This relativistic view may then be used for several purposes, including, but not limited to:

the coordination of tasks;

determining the validity of information obtained from other processes;

fault detection and isolation;

voting and agreement paradigms.

However, this invention is intended to be a general purpose distributed computing solution and thus may be used to provide a relativistic view of the state of any object.

Three mechanisms are provided for defining a relativistic view of the state of processes/objects: 1) state vector (SV); 2) state matrix (SM); and 3) application specific (AS) logic for providing AS state vectors and AS state matrices. The following discussion will refer to objects, but is understood to be applicable to processes as well.

1. State Vector

A state vector is a one-dimensional associative array of logical object name to logical object state. Each name is an "index" into the vector, and each state is stored in a "slot" associated with an index. A state vector is generated by an object and describes what that object thinks the state of all objects in the vector is. It is the object's view of itself and "relative" view of all other objects.

FIG. 4 illustrates a state vector 70 generated by Object A. In this example, Object A thinks itself to be in State 1 and thinks Object B is in State n, Object C is in State 3, and Object D is in State 2. This vector may be extended indefinitely.

The following general rules may apply to any State Vector:

The state of a State Vector is defined to be "determinant" if and only if each slot in the vector has an equivalent logical state; that is, all state values across the vector are logically equivalent. If a vector's state is determinant its logical state as a whole is equivalent to the state of any slot. Finally, any subset of the vector (degenerating to single logical name-value pair) is in turn a State Vector.

2. State Matrix

A State Matrix is a two-dimensional associative array composed of State Vectors. Rows and columns of the State Matrix are indexed by logical object names. Rows in this matrix describe what each object thinks is the state of all other objects in the row (this is the same as the State Vector described above). Columns in this matrix describe what all objects think is the state of a single object.

Figure 5:
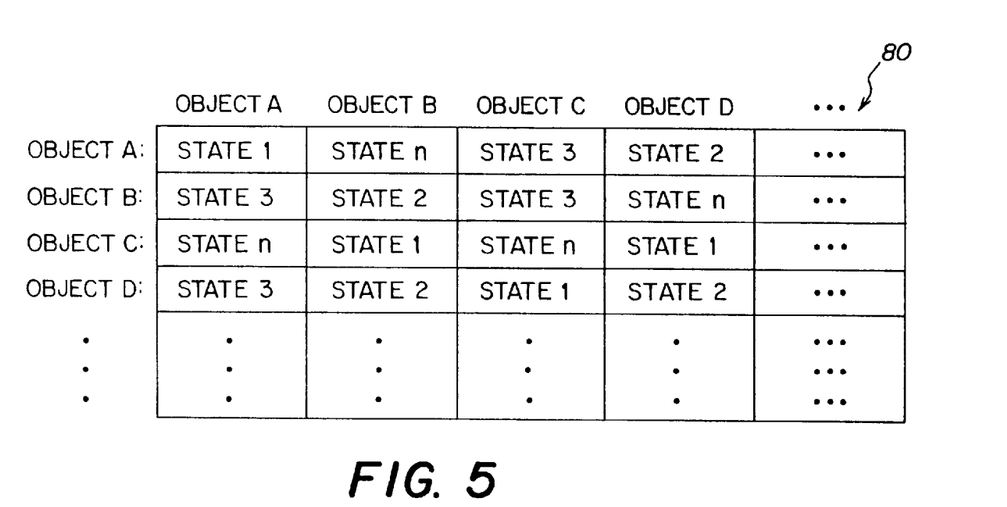
FIG. 5 is an example of a state matrix comprising a plurality of state vectors.

FIG. 5 illustrates a state matrix 80 generated by the combination of State Vectors for objects A through D. In this case, each object has provided a State Vector (row) to the matrix. The column vector for Object A indicates that Object A thinks itself to be in State 1, Object B thinks object A is in State 3, Object C thinks Object A is in State n, and Object D thinks Object A is in State 3. Once again, this matrix may be extended indefinitely.

The following general rules may apply to any State Matrix:

A State Matrix is "row determinant" if and only if each of its Row State Vectors are determinant. A State Matrix is "column determinant" if and only if each of its Column State Vectors are determinant. A State Matrix is "determinant" if and only if it is both row determinant and column determinant. When a State Matrix is determinant its state as a whole is equivalent to the state of any one of its slots. Finally, any subset of row and column logical names (indexes) of the matrix (degenerating to single row/column logical name) and their associated slot values in turn defines a State Matrix.

In alternative embodiments, the general rules for a state matrix may require it to be: 1) row determinant; 2) column determinant; 3) matrix determinant; or 4) any combination of 1)–3).

3. Application Specific Logic (ASL)

The preceding sections described the general rules associated with State Vectors and State Matrices. These general rules provide the foundation for organizing and understanding relativistic state information. Application Specific Logic (ASL) is a set of rules specific to an application that provides meaning beyond that of the basic State Vectors and State Matrices.

Because State Vectors and State Matrices are objects, ASL may be added to them through specialization (derivation). FIG. 6 illustrates the derivation of Application Specific State Vectors (ASSVs) 90 and Application Specific State Matrices (ASSMs) 91 from the base State Vector (SV) 92 and State Matrix (SM) 93 objects, respectively. In this diagram the (O,m) cardinality relationship indicates that the State Matrix is composed of zero or many State Vectors. Note that this relationship is inherited by ASSVs and ASSMs.

4. Example of ASL Usage

Figure 7:
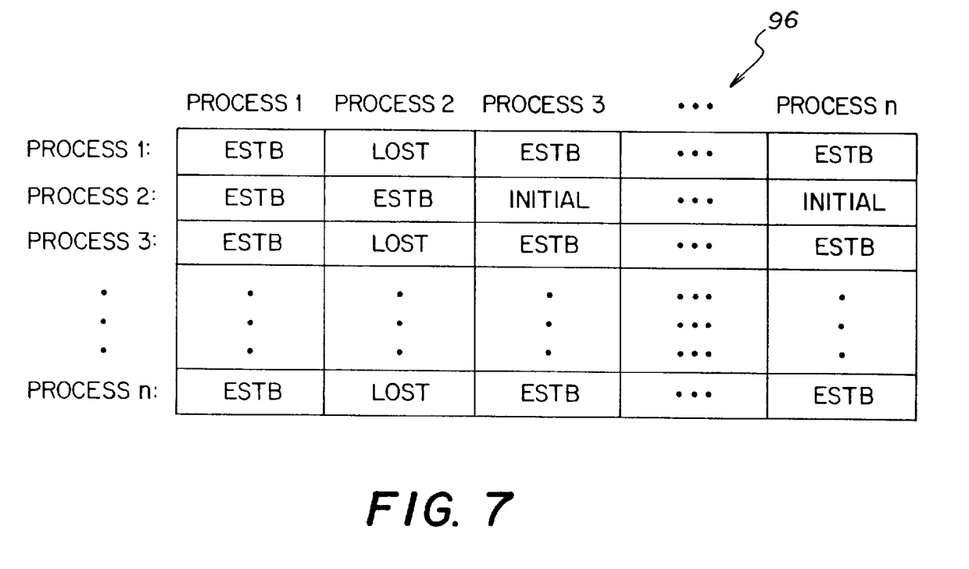
FIG. 7 is an example of a state matrix for a distributed application, showing the contact status of its component processes.

The following example, illustrated in FIG. 7, demonstrates the usage of ASSVs and ASSMs to determine the contact status of processes in a distributed application. In this example Contact Status Vector and Contact Status Matrix objects have been derived from the original SV and SM objects and ASL has been added.

Consider a distributed application that may run with one or many processes (1 through n) at any given time. On start up, each process initializes its internal Contact Status Matrix (CSM) 96 and attempts to contact a set of other processes. A CSM is indexed by logical process name and has the following possible state values:

INITIAL—no information about the process has been obtained yet

ESTB—contact with the process has been established

LOST—the process either can not be contacted or contact with a previously contacted process has been lost Every time the contact status of a process changes (to either ESTB or LOST) from the perspective of a process, that process sends a Contact Status Vector to all other processes with which it has established contact. Upon receiving a Contact Status Vector from a process each process places this vector in its CSM at the row indexed by the sending process' logical name. In this way each process is able to build up a complete relativistic view of process state.

Application Specific Logic is then used to determine what this process state means. In the case of CSMs, determinism is defined by the following rules:

A CSM for a process is determinant when:
1) the process's row vector does not contain any INITIAL states, and
2) the Contact Status Vectors obtained by:
   a) copying the column Contact Status Vectors of the CSM,
   b) each column vector of the CSM (excluding column vectors for processes that are LOST from the perspective of the present process) is determinant.

Basically, the first rule ensures that the process attempts to contact all other processes before trying to determine if the CSM is determinant. The second rule excludes any processes from consideration if they are thought to be lost (the assumption is that lost processes can not provide valid data). Thus, as shown in FIG. 7, the CSM for process 1 is determinant.

5. Updating State Information

Figure 8:
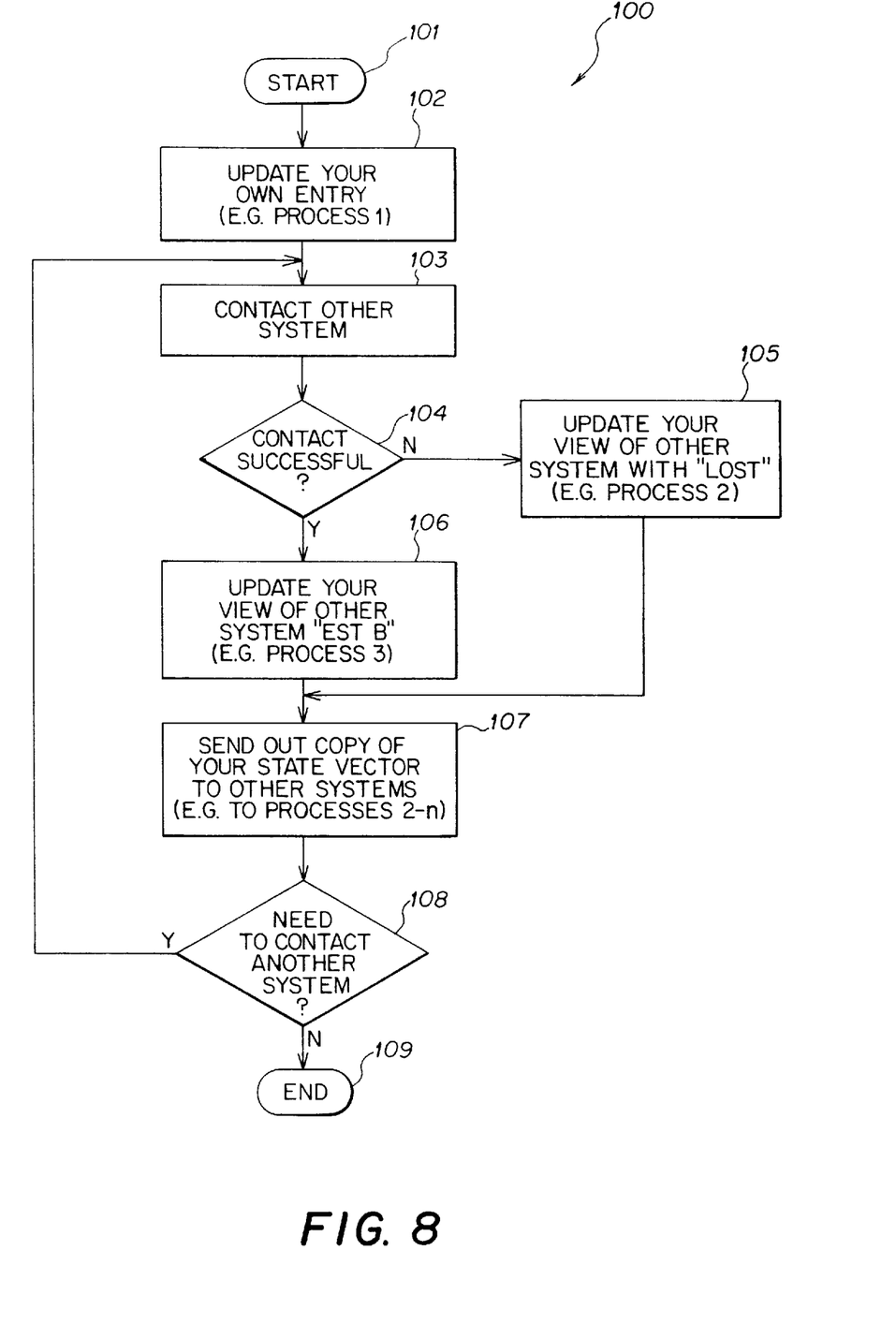
FIG. 8 is a flow chart of a method for updating a state matrix.

FIG. 8 is a flowchart of a method for updating state information 100. Starting at Step 101, a particular system (e.g., process 1) updates its own contact status vector (Step 102). Next, process 1 contacts the other systems (Step 103). Further action depends upon whether the contact is successful (Step 104); if not successful, process 1 updates its state vector with "lost" for the noncontacted system, e.g. process 2 (Step 105). If contact was successful, process 1 updates its state vector with ESTB for the contacted system, e.g., process 3 (Step 106). In either case, process 1 then sends out a copy of its state vector to the other systems, e.g., processes 2–n (Step 107). Then, process 1 continues to contact other systems (Step 108); when all processes have been attempted to be contacted, the method ends (Step 109).

Applications

The RRM has many areas of potential application. For example, in a switched communications network having a distributed call management system, a resource manager can be provided for each of a plurality of distributed call management processes. See for example the switched network described in copending and commonly owned U.S. Ser. No. 08/188,238 filed Jan. 28, 1994 by K. Dobbins et al., hereby incorporated by reference in its entirety. A distributed memory space can be divided into separate pools for each of the following services: topology, directory, policy and call. A first benefit of incorporating RRM in this system is that every process is provided with a consistent view of the network. For example, every process can have access to a policy pool which may specify, for example, that node-a is permitted to communicate with node-b. As a further example, when a node in the network topology changes, it is important that every switch be notified of the change. Using RRM, state changes are seen everywhere so that every switch has the same view of the network topology. A second benefit is fault tolerance; for example, because the call pool has an object for every call, if one call management process goes down, another call management process can take over the calls in the call pool previously owned by the failed process; this can be done quickly with essentially no interruption in service. A third benefit is load sharing. The various call management processes can distribute ownership of calls in order to balance the workload. A fourth benefit is scalability; additional call processes can be added to the system easily without requiring reprogramming of the prior systems. Yet another important benefit from a programming perspective is that the programmer does not need to know where any given method or change of object is executed, only that the result is the same.

Another potential use of RRM is for distributed text-based conferencing. For example, each of three users at different locations can pull up a common screen on their computers with, for example, three windows, each window representing a separate conversation (a pool). The contents of a given conversation are shared buffer objects (resources). Each user would be able to input information into a buffer (screen), virtually at the same time. The process owning the shared buffer would act as a "gatekeeper" to the window, arbitrating inputs from the three users. Every character input into the buffer object is in essence a state change, which is arbitrated and if permitted appears substantially instantaneously on each of the three user screens.

The arbitration logic decides what other users can do to the object. For example, if a first user (first process) needs to use an object owned by a second user (second process), the first user sends a request to the second process which will perform the method and update the object. The state change then goes automatically to every process, not just the requesting process.

In contrast, in the prior art it was necessary to replicate a database, table, or list, on an individual basis. It was not possible to get the most recent data unless one contacted a central repository, which quickly became a bottleneck and/ or was a potential point of failure. In contrast, in the present embodiment every state change goes to every interested process, not just the requesting process. Also, because the data is distributed, there is no bottleneck and no one point of failure.

The embodiment described herein assumes a communications network is modelled in memory, such as cache memory in a network manager. The network manager may be a Sun workstation sold by Sun Gateway 2000 with a Sun Solaris Microsoft Windows NT operating system; the network management software may be the Spectrum™ Network Management software sold by Cabletron Systems, Inc., Rochester, N.H., USA and described in U.S. Pat. No. 5,261,044 by R. Dev et al., which is hereby incorporated by reference in its entirety. Typically, the network manager resides in a host and the resources of a network provide alerts to the host which are received and interpreted by the network manager in accordance with known techniques. The resources of a network may include a plurality of individual workstations, personal computers, modems, applications resident in host computers, communication satellites, and the like. In a modelled network, a change made by an application to one resource of the network, which affects the other resources of the networks, will be immediately known and accounted for since the model of the network within the data cache manager accounts for these inter-relationships.

The Spectrum™ software and the software of the present invention may be written in an object-oriented programming language such as C++. In an object-oriented approach, data and methods (logic in the form of executable code) are combined to form objects. The objects are logically grouped by classes and superclasses in a tree (hierarchy) structure, wherein an object inherits structure from its class, i.e., objects in the same class share the same data organization. An object can represent a single resource of a process being controlled; in a network, an object can represent processors, applications which control communication and data flow within a network, switches, storage devices, printers, routers, modems, etc.

Figure 9:
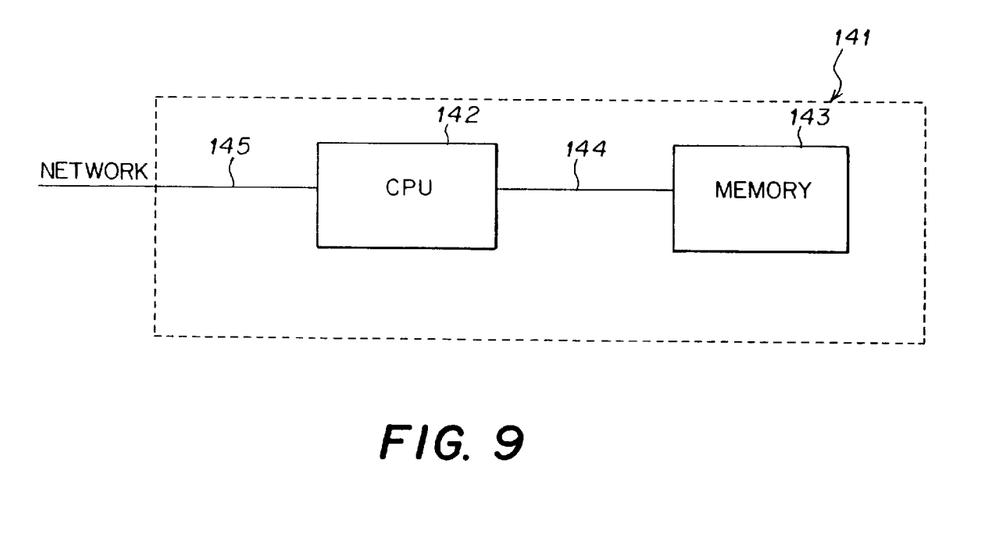
FIG. 9 is a schematic illustration of a general purpose computer for implementing the invention.

The program of the present invention may be implemented in a general purpose computer 141 such as shown in FIG. 9. As can be seen, the general purpose computer includes a computer processing unit (CPU) 142, memory 143, a processing bus 144 by which the CPU can access the memory, and access to a network 145. This invention does not require the network topology to be modeled; can be used in many applications.

Glossary of Terms

Resource Manager (RM)—A central component of the Replicated Resource Management (RRM) system—it provides a registry of Resource Objects and a mechanism for communicating with other Resource Managers.

Object Identifier (OID)—A network unique logical identifier for an object. OIDs maintain uniqueness across both time (process) and space (pool) boundaries for the life-span of an object.

Service Address—An abstract address which uniquely identifies an RRM process in a distributed computing function. In IP networks, it is formed by a (Host-Name, port number) tuple. Each Resource Manager has a service address.

Service OID—Each Resource Manager process is assigned a network unique identifier. In IP nets, it is generated by combining the globally unique Host-Name with the specific port number used by that Resource Manager process.

Resource Pool (RP)—A distributed object whose purpose is to collect and organize a coherent set of distributed resources. It can be thought of as a shared memory space. Resource Pools are embodied through a set of one or more Resource Managers on one or more host systems. Resource pools are used to segment the overall distributed memory space so as to limit the distribution of objects.

Pool OID—Each Resource Pool is assigned a network unique identifier.

Resource Object—A software object (as in object-oriented programming) whose data may be significant to the overall system. Resource objects are contained within Resource Pools and, like the Resource Pools, are distributed objects. They exist in all Resource Managers associated with their containing Resource Pool. Resource objects are sub-classed by users of the system so as to provide application level object information (i.e., users derive their objects from the resource class). In this way, the users' information is replicated across all applicable Resource Managers.

Resource OID—Each resource is assigned an OID at creation time. A Resource OID may be logically constructed as follows: PoolOID.ServiceOID.InstanceID (where InstanceID is a unique logical value given PoolOID.ServiceOID). This logical naming allows a resource to exist in a pool across process boundaries without OID conflicts.

Pools of Interest—Each Resource Manager has a set of associated resource pools in which it is interested. The Resource Manager will specify its Pools of Interest, after which time it will receive all the Resource Objects in its associated Pools of Interest.

Resource Ownership—A Resource Object is owned by a single Resource Manager at any point in time. It is this Resource Manager (or the application code running within its context) that is responsible for maintaining the state of the Resource Object and distributing any changes to the other participating Resource Managers (interested in the Resource Pool containing that Resource Object). Resource ownership may change at any time through the following circumstances: 1) the current owner reassigns ownership to another Resource Manager; or 2) the current owner leaves the network (i.e., fails). In the event of Resource Manager failure, all of its owned resources become unowned and may be claimed by any remaining Resource Manager. Resource specific arbitration logic is responsible for determining which Resource Manager will claim the orphaned resources. The Resource Manager claiming ownership then notifies the application in which it is running that the resource ownership has changed. A default ownership arbiter is provided to evenly distribute resources among remaining Resource Managers.

Resource Synchronization—Only the process with the owning Resource Manager may modify the contents of a Resource Object. A resource Object's contents may be modified using a 'write_attr( )' method. When a set of changes is complete, a 'commit( )' method causes the changes to be synchronized with all other Resource Managers interested in the pool containing the changed Resource Object.

RRM supports two different synchronization modes. The first, entitled, "Foreground Synchronization," does not return from the commit( ) method until all Resource Managers in the resource's pool have confirmed reception and processing of the synchronization. The second, entitled, "Background Synchronization," returns as soon as the synchronization messages have been sent to the associated Resource Managers. Foreground Synchronization may be used for resources with zero-tolerance for incomplete synchronization. Background Synchronization may be a default mode of operation—it yields much better transaction performance with only a small window for mis-synchronization. In the event of failure of Foreground Synchronization, a transaction.backout( ) method is available for removing the changes made to the Resource Object.

Resource Attributes—RRM supports two main types of attributes: value attributes and reference attributes. Value attributes include basic data types: integer, float, string, etc., as well as composites of basic data types (e.g., tuples, lists and dictionaries). Value attributes are synchronized by transferring the actual value to the associated (interested) Resource Managers. Reference attributes are references to other Resource Objects. Reference attributes are synchronized by transferring the OID of the referenced Resource Object to the interested Resource Managers.

Synchronization—Synchronization may occur on one or more of three levels: Resource Objects; Resource Pools; Resource Managers (from lowest to highest). For example, synchronization on a Resource Pool level occurs when a Resource Manager joins a pool (either explicitly or implicitly). A pool is joined "explicitly" through a join pool message sent from the Resource Manager requesting to join the pool. "Implicit" joins occur when a Pool Status Vector (relative to that pool) indicates that a new Resource Manager is interested in that pool. Pool Synchronization is determined through the use of a Pool Status Matrix (see below).

Initialization—Initialization occurs when a Resource Manager object is instantiated. The initialization method does not return until the new RM has established contact with all available RMs and each of those RMs has synchronized with the new RM. Therefore, after creation of a Resource Manager, an application can be ensured that it has a local, current copy of all the Resource Objects in each of its Pools of Interest.

Failure Detection—Failure detection is provided by the communication layer. For example, each Resource Manager (RM) may use a TCP Server object to communicate with other RMs. Whenever the process or system in which an RM is running terminates, the local TCP Server (or a UDP Keep Alive Module) notifies its RM that it has lost contact with a given Service Address. Once the RM has confirmed a Determinant Contact Status (see below), the RM notifies all of its Resource Pools that the corresponding Service Address has gone down and synchronization to that RM is suspended. Any Resource Objects within affected pools (pools that the failed RM was interested in) are notified of the process failure.

Contact Status Vector—The Contact Status Vector is an associative array of Resource Manager Service Addresses to contact status (state) mappings. Whenever the local contact status of an RM changes, the changed RM sends a Contact Status Vector to all active RMs to notify them of the state change. Upon reception of a Contact Status Vector, each RM fills in its Contact Status Matrix and attempts to contact any unrecognized RMs in the vector.

Contact Status Matrix—Each Resource Manager (RM) maintains a Contact Status Matrix. Each row in this matrix is a Contact Status Vector representing the contact status as seen by each RM in the network. In short, the matrix maintains a complete relativistic view of the contact status of the RMs.

Determinant Contact Status—Determinant Contact Status is achieved when all active RMs (from the local RM's viewpoint) agree on the present state of all other RMs (i.e., each active column of the Contact Status Matrix has a determinant state, that is, every slot in the column has the same state value).

Pool Status Vector—A Pool Status Vector is an associative array of Resource Manager Service Addresses to pool status (state) mappings. Whenever the local synchronization status of a Resource Pool (RP) changes, the changed RP sends a Pool Status Vector to all interested RMs to notify them of the pool's state change. Upon reception of a Pool Status Vector, each RM forwards the message to the appropriate RP. The receiving RP fills in its Pool Status Matrix and synchronizes with any unrecognized RMs in the vector (Implicit Synchronization).

Pool Status Matrix—Each Resource Pool (RP) maintains a Pool Status Matrix. Each row in this matrix is a Pool Status Vector representing the Pool Status as seen by each RP in the network. In short, the matrix maintains a complete relativistic view of the pool status of the RPs.

Pool Synchronization—A Resource Pool is synchronized when all slots in its Pool Status Matrix indicate a synchronization complete state, that is, when all RMs have synchronized with the Resource Pool.

While there have been shown and described several embodiments of the present invention, it will be obvious to those skilled in the art that various changes and modifications may be made therein without departing from the scope of the invention as defined by the appending claims.

What is claimed is:

1. A method of accessing resource objects contained in a distributed memory space in a communications network comprising:

dividing the distributed memory space into one or more memory pools, each memory pool comprising a dedicated plurality of segments of the distributed memory space for storing a collection of resource objects, each resource object being a software object having a network unique identifier and containing methods and attributes;

providing a plurality of resource manager objects, each resource manager object having an associated set of memory pools and a registry of the network unique indentifiers for the resource objects in the associated set of memory pools; and accessing a given resource object via its network unique identifier in the registry of the resource manager object.

2. The method of claim 1, further including providing a plurality of processes to perform a distributed processing function, each process having an associated resource manager object, and the plurality of processes sharing the methods and attributes of the resource objects in at least one associated memory pool in order to provide the distributed processing function.

3. The method of claim 1, further comprising constructing a distributed application, utilizing a plurality of processes located on a plurality of host systems in the network, by providing each process with an application interface to the resource manager objects.

4. The method of claim 1, further including transporting distributable representations of resource objects to the resource manager objects for an associated memory pool.

5. The method of claim 1, wherein each resource object includes one or more methods for changing an attribute's value and one or more methods for sending the attribute's value to the resource manager objects of the associated memory pool.

6. The method of claim 1, wherein the resource manager objects provide location-independent object-level messaging based on objectOIDs.

7. The method of any one of claims 2 and 3, wherein the processes perform one or more of the following steps:

(a) examine the resource objects;

(b) use the resource objects;

(c) instantiate the resource objects;

(d) delete resource objects from the associated memory pool;

(e) change the attributes of the resource objects;

(f) synchronize the change of attributes of the resource objects;

(g) receive attribute change notifications for the resource objects;

(h) use any one of object level messaging and object level remote procedure calls for any one of steps (a) through (g).

8. The method of any one of claims 1, 2 and 3 wherein the resource manager objects perform one or more of the following steps:

(i) object transport;

(j) object level message delivery;

(k) automatic object replication;

(l) resource manager object synchronization;

(m) failure detection.

9. The method of claim 2, wherein the plurality of processes communicate through object level messaging and object level remote procedure calls.

10. The method of claim 2, further comprising:

assigning ownership of each of the resource objects to any one of the processes, wherein work requested by calling a method of an owned resource object is performed by the process that owns the called resource object.

11. The method of claim 2, wherein each resource manager object maintains state information which is used for one or more of the following:

coordination of work among the processes;

determining validity of data obtained from the processes;

fault detection and isolation;

voting and agreement paradigms.

12. The method of claim 2, wherein the resource manager objects perform process level failure detection.

13. The method of claim 2, wherein the processes are organized in a peer-to-peer configuration.

14. The method of claim 2, wherein ownership of each resource object is assigned to one of the processes, and the work requested by calling a method of an owned resource object is performed by the process that owns the called resource object.

15. The method of claim 2, wherein each memory pool is assigned a pool identifier which is unique across process boundaries.

16. The method of claim 2, wherein each resource manager object is assigned a resource manager object identifier which is unique across process boundaries.

17. The method of claim 3, wherein the distributed application is a network switch control application, and memory pools are provided relating to the following services: network topology; policy; directory; and calls.

18. The method of claim 3, further comprising applying application specific logic for deriving application specific objects from the resource objects.

19. The method of claim 10, wherein:

if one of the processes fails, the ownership of resource objects of the failed process is automatically reassigned to another one of the processes.

20. The method of claim 10, wherein when a first joining process of a first resource manager object seeks to join a first memory pool, the first memory pool is synchronized by:

the first resource manager object sending a join pool request to the other resource manager objects;

each resource manager object already joined in the first memory pool responding to the request by sending all the resource objects owned by its associated process to the joining process; and the first resource manager object sending all of the resource objects owned by the joining process to the already joined processes.

21. The method of claim 11, wherein each resource manager object maintains state information for a contact status determination and for its associated memory pools and the resource manager objects synchronize the state information.

22. The method of claim 11, wherein the state information forms a state matrix and synchronization requires the state matrix to be determinant.

23. The method of claim 11, wherein each resource manager object maintains a relativistic view of state based upon state information received from other resource manager objects.

24. The method of claim 14, wherein the network unique identifier is an object identifier (OID) that is unique across process boundaries, and the OID comprises:

PoolOID.ServiceAddress.InstanceID where:

PoolOID identifies the memory pool which contains the resource object;

ServiceAddress identifies the process that created the resource object; and

InstanceID is a unique ID identifying an instance of an object under the prefix given by PoolOID.

25. The method of claim 14, wherein upon failure of one of the processes, each resource object owned by the failed process calls an ownership arbitration method in order to assign ownership to another process.

26. The method of claim 14, wherein object ownership is reassigned in order to redistribute the processing load.

27. The method of claim 14, wherein object ownership is reassigned in order to allow a resource manager object to leave an associated memory pool.

28. In a communications network having a distributed memory space in a plurality of hosts, apparatus for managing the distributed memory space comprising:

the distributed memory space being divided into a plurality of memory pools, each memory pool comprising a dedicated plurality of segments of the distributed memory for storing a collection of resource objects, each resource object being a software object having a network unique identifier and containing methods and attributes; and a plurality of resource manager objects located on different hosts in the network, each resource manager object having an associated set of memory pools and a replicated set of resource objects for the associated memory pools.

29. In a distributed computing method, wherein a number of cooperating processes require access to resource objects, the improvement comprising:

a) providing a distributed memory space containing resource objects;

b) providing a plurality of pool objects, each pool object identifying an associated set of resource objects for dividing the resource objects in the distributed memory space into pools, wherein each pool comprises a plurality of dedicated segments of the distributed memory;

c) providing each cooperating process with a resource manager object object, each resource manager object object identifying an associated set of pools in which the cooperating process requires access to the contained resource objects;

d) each resource manager object object replicating the resource objects in its associated set of pools and providing access by the cooperating process to the replicated resource objects; and e) each resource manager object object synchronizing its state with the other resource manager object objects.

30. The method of claim 29, further comprising the step of:

storing the resource objects in a persistent storage medium.

31. The method of claim 29, wherein the synchronizing step includes:

determining whether the resource manager object object is in an active state.

32. The method of claim 31, wherein the synchronizing step includes:

determining the state of the pool objects.

33. The method of claim 29, further comprising:

assigning ownership of each resource object to any one of the processes, wherein the owning process is responsible for the work performed by the owned resource object.

34. The method of any one of claims 29 and 32, wherein the determining step includes:

generating a state vector comprising the object's view of itself and relative view of other objects.

35. The method of claim 32, wherein the synchronizing step includes:

determining the state of the resource objects.

36. The method of claim 33, further comprising the step of:

a cooperating process leaving the computing function by sending a leave pool message to the resource manager objects already joined to the pool.

37. The method of claim 33, further comprising the step of:

the resource manager objects determining a distribution of workload among the processes.

38. The method of claim 33, further comprising the step of:

a new cooperating process joining the computing function by sending a join pool message to the resource manager objects.

39. The method of claim 34, wherein the determining step comprises:

determining whether the state vector is determinant.

40. The method of claim 34, wherein the determining step comprises:

generating a state matrix of state vectors.

41. The method of claim 34, further comprising:

applying application specific logic to the state vectors by derivation to provide application specific state vectors.

42. The method of claim 40, wherein the determining step comprises:

determining whether the state matrix is determinant.

43. The method of claim 40, further comprising:

applying application specific logic to the state matrices by derivation for providing application specific state matrices.

44. The method of claim 43, further comprising:

determining the contact status of the cooperating processes from the application specific state matrices.

45. Apparatus for performing a distributed computing function in a system having a plurality of hosts, each host having a local processer and memory apportioned into one or more pools, where each pool comprises a dedicated plurality of segments of the memory, the apparatus comprising:

a first host including a first process and a first resource manager object which identifies one or more pools containing resource objects which the first process requires access to;

a second host including a second process and a second resource manager object which identifies one or more pools containing resource objects which the second process requires access to; and each resource object being contained in the local memory of the host having the process which requires access to the resource object;

wherein each of the first and second processes can access the resource object in local memory contained in the same host as the process.

46. In a system comprising a plurality of hosts and a connection device for enabling communication between the hosts, each host having a local processor and local memory apportioned into one or more pools, each pool comprising a dedicated plurality of segments of the local memory, and the combined local memories comprising a distributed memory space, a software system for enabling the hosts to perform a distributed computing function comprising:

a plurality of cooperating processes contained on different hosts;

each cooperating process having a resource manager object identifying an associated set of pools in which the cooperating process requires access;

a plurality of pool objects for dividing the distributed memory space into pools, each pool object identifying an associated set of resource objects contained in the distributed memory space; and each host which contains a cooperating process having the pool objects and the resource objects to which the cooperating process requires access.

* * * * *